Patented Sept. 7, 1937

2,091,956

UNITED STATES PATENT OFFICE 2,091,956

SULPHURIC ACID ESTERS OF HIGHER GLYCOLS

Roland George Benner, Carneys Point, N. J., assignor to E. I. du Pont de Nemours & Company, Wilmington, Del., a corporation of Delaware No Drawing. Application August 6, 1935, Serial No. 34,894

14 Claims. (Cl. 260—99.12)

This invention relates to new chemical compounds, their methods of preparation and their uses, and more particularly to new detergents, wetting out agents, and emulsifying agents which may be obtained by forming the neutral salts of the sulphuric acid esters of higher glycols.

It is already known that the sulphuric acid esters of long chain primary aliphatic alcohols such as those disclosed in Bertsch Patents 1,968,793; 1,968,794; 1,968,795; and 1,968,797 are valuable detergents, wetting out agents, and emulsifying agents. In this invention, the starting materials are distinctly different from those used by Bertsch, being in all cases secondary alcohols having two hydroxyl groups per molecule. These glycols can, in general, be manufactured more economically on the basis of the starting material than can the primary alcohol derived from the same materials. It thus will be seen that this invention provides a method for the manufacture of good detergents, wetting out agents, and emulsifying agents which not only is economical but also results in new products which are superior in many respects.

This invention has as an object the manufacture of new detergents, wetting out agents and emulsifying agents which agents are stable towards lime and acids and are superior to the usual soaps or other substances used for such purposes. A further object is to provide novel and easily conducted processes whereby these new products may be obtained. A still further object is to employ these products for a variety of technical purposes. Other objects will appear hereinafter.

These objects are accomplished by the following invention according to which higher glycols are sulphated at one or both hydroxyl groups by means of sulphuric acid, chlorsulphonic acid, acetyl sulphuric acid, oleum or oleum in the presence of acetic acid or acetic anhydride, and the neutral alkali metal salts of the resulting sulphuric acid esters are then formed.

For this process, a suitable starting material is selected from glycols having a general formula: R'—CHOH—CHOH—R'', in which R' represents a saturated or unsaturated alkyl radical having at least five and not more than eighteen carbon atoms in its chain, and R'' represents a saturated or unsaturated alkyl radical which may or may not be the same as R', but not containing more than eighteen carbon atoms.

These glycols may be obtained by known methods, as for example, by the sodium reduction of the esters of higher fatty acids followed by hydrogenation of the resulting acyloins to glycols. Preferred methods for preparing these glycols are disclosed in a co-pending application of Hansley filed December 5, 1933, Serial Number 701,052.

To the starting material which may consist of either a mixture or of a single compound, and which may be in the liquid state or dissolved in an inert solvent, is added the sulphating agent, at a temperature between 10° C. and 80° C. for a period of from 20 to 180 minutes; efficient agitation and slow addition of the sulphating agent are desirable. The sulphation may be conveniently carried out in a vessel made of glass, enamel ware, stone ware, lead, aluminum or any other suitable material. The sulphation mass becomes colored, changing to a very dark red or brown, and a heat of reaction is usually noticed. It is neutralized by pouring into a rapidly stirred solution of alkali metal hydroxide such as sodium hydroxide, the concentration of which may be varied within wide limits. The alkalinity is adjusted to a faint pink to phenolphthalein or other suitable indicator. The resulting mass may be drum dried, or dried in vacuo, and in order to remove any unsulphated material, the dried product may be extracted with a suitable solvent such as petroleum ether. The residues remaining from the ether extraction are water soluble, have good foaming properties, and are good detergents, wetting out agents, and emulsifying agents, especially in acid and hard water. It should be understood that the solvent extraction is not always necessary, but that in some cases, the product may be improved by this treatment.

The salts obtained in this way are assumed to have the following general formula:

$$R'—CH(OSO_3M)—CH(OSO_3M)—R'',$$

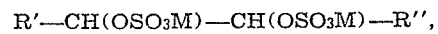

in which R' and R'' are the same as in the earlier definitions, and M represents an alkali metal. For the monosulphated bodies, either of the hydroxyl groups is assumed to be sulphated.

In order to further illustrate the invention, the following examples are given in which all parts are by weight.

Example 1

Forty-nine parts of dry technical diundecyl ethylene glycol, $C_{11}H_{23}CHOH—CHOH—C_{11}H_{23}$, having a melting range of 91–95° C. or higher are dissolved in 80 parts of trichlorethylene and heated to 60° C. after which, 35 parts of chlorsulphonic acid are added at 45–50° C. during 90 minutes with vigorous stirring. The mass becomes red in color and then turns dark. It is poured slowly into a neutralizing solution composed of 320 parts water and 20 parts sodium hydroxide. The resulting mass becomes yellow and eventually separates into two layers. The oily layer is salted out by adding 50 parts of sodium chloride, separated from the aqueous layer and dried in a vacuum drier at 40° C. The dried product is thoroughly washed with petroleum ether yielding a light colored product soluble in water and having strong foaming properties. This material is a very good detergent in soft and acid water and is also good in alkaline and hard water. It is a good wetting out agent and a superior emulsifying agent.

*Example 2*

Fifteen parts of glacial acetic acid are cooled to 18° C. and agitated in a glass or enameled vessel while 30 parts of 65% oleum are slowly added with cooling so that the temperature is maintained below 20° C. at all times. This may require about 30 minutes. Then 25 parts of finely powdered diundecyl ethylene glycol, $$C_{11}H_{23}CHOH—CHOH—C_{22}H_{23},$$

(the beta or high melting isomer) are slowly added to the well stirred mixture of oleum and acetic acid during 40 minutes at 18–23° C., never exceeding 25° C. The mass is then stirred an additional 100 minutes at 15–23° C.

At this point, the mass is substantially all soluble in water, and it is poured into a mixture of 150 parts ice, 100 parts water and approximately 30 parts sodium hydroxide. If the neutralization mass is acid, it is made neutral to phenolphthalein indicator with more sodium hydroxide. The neutralizing solution must be kept cool, (below 25° C.) by means of cooling. The product is a yellowish white pasty material and is drum dried to yield cream colored flakes having properties quite similar to those exhibited by the material obtained in Example 1.

*Example 3*

Sixteen parts of dinonyl ethylene glycol, $$C_9H_{19}CHOH—CHOH—C_9H_{19},$$

finely ground, are added in small portions to 9.8 parts of 99.75% sulphuric acid at 40–50° C. with efficient stirring during 75 minutes. A gas is evolved and the mass assumes a reddish appearance. After 10 minutes additional stirring, it is poured into a solution composed of 180 parts water and 6 parts sodium hydroxide with rapid agitation and external cooling. The solid material separating is filtered off after making neutral to phenolphthalein indicator, and is then dried in a vacuum oven. The unsulphated material is extracted by treatment with petroleum ether or benzene. The remaining material is a white powder, soluble in water and having good foaming properties. This product has properties similar to those disclosed in the preceding examples, although the detergency is somewhat less effective.

Dinonyl ethylene glycol is the catalytic hydrogenation product of the acyloin from methyl caprate. The preparation of this acyloin is disclosed in Hansley Patent 1,996,471. The hydrogenation of this acyloin, $$\begin{array}{l}C_9H_{19}C=O\\C_9H_{19}CHOH\end{array}$$

to the glycol, $$\begin{array}{l}C_9H_{19}CHOH\\C_9H_{19}CHOH\end{array}$$

is easy and similar to the catalytic reduction of the $C_{16}$, $C_{24}$, $C_{28}$ and $C_{36}$ acyloins described in application Serial Number 701,052.

*Example 4*

Thirty-eight parts of diheptyl ethylene glycol, $$C_7H_{15}CHOH—CHOH—C_7H_{15},$$

are melted and 36 parts of chlorsulphonic acid are then dropped slowly into the molten mass at 48–52° C. during 45 minutes with efficient stirring. There is a heat of reaction, HCl gas is given off, and the mass becomes dark colored. The sulphation mass is neutralized by pouring into a solution of 270 parts water and about 22 parts sodium hydroxide. From the resulting neutral mass may be separated an oily layer, which upon treatment with petroleum ether to remove residual unsulphated material, yields a yellowish solid, somewhat waxy in nature which is water soluble, a good foaming agent, and has properties similar to the products described in the preceding examples. For the preparation of diheptyl ethylene glycol see C. R. 136, 1677, in addition to the Hansley application mentioned above.

*Example 5*

Twenty-five parts of a mixed glycol formed from an acyloin which is made from equal molecular parts of the butyl esters of lauric and caprylic acids are dissolved in 100 parts of trichlorethylene and 25 parts (excess) of chlorsulphonic acid are added at 50° C., gradually lowering the temperature to 35–40° C. The addition is carried out slowly with efficient stirring, and after all the acid has been added, agitation is continued for 10 minutes. The mass is clear and dark colored. It is neutralized by pouring into a solution of 100 parts of water containing approximately 10 parts of sodium hydroxide. External cooling is desirable. In order to remove unsulphated material from the product, the resulting mass is dried and extracted with petroleum ether from a 50% water-alcohol solution. The residue remaining in the aqeous solution is a white to yellow powder after drying, and is a good detergent in hard water.

The preparation of the starting glycol used in this example is as follows: The parent mixed acyloin was prepared in a manner similar to the preparation of simple acyloins in U. S. P. 1,996,471, except that equal molar parts of the butyl esters of lauric and caprylic acids were used. The catalytic hydrogenation was effected as follows: 397 gms. of the mixed acyloin were placed in an autoclave with 15 gms. of nickel catalyst and 700 cc. of ethanol. Hydrogenation was complete at 125° C. and 1000 lbs. hydrogen pressure. The yield was quantitative and the acetyl value of the mixed glycol was 251.

*Example 6*

Twenty-five parts of a mixed glycol obtained from an acyloin which is made from the secondary butyl esters of lauric acid and six-carbon branch chain acids are dissolved in 67 parts of chloroform, and 25 parts of chlorsulphonic acid are added slowly with stirring beginning at a temperature of 50° C. which is gradually lowered to 35–40° C. after the first few minutes. The sulphation requires about 20 minutes, and the mass is then stirred 10 minutes longer. It is poured into a cold solution consisting of 100 parts of water and about 10 parts of sodium hydroxide with efficient stirring and cooling. After making the mass neutral to phenolphthalein with more sodium hydroxide, it is drum-dried yielding flakes which are soluble in water. The detergency may be improved by extracting unsulphated material. The product is useful as a detergent, wetting agent and emulsifying agent.

The preparation of the starting glycol used in this example is as follows: The parent acyloin was prepared in a similar manner to that described in U. S. P. 1,996,471 for simple acyloins except that the secondary butyl esters were used. The acyloin obtained consisted in this case of 22.5% of the simple $C_{12}$ acyloin, and 70.5% of the mixed acyloin including an amount of simple lauryl acyloin in an amount corresponding to the $C_{12}$ acyloin. The 22.5% of low molecular weight acyloin was separated by steam distillation leaving the 70.5% of solid higher molecular weight acyloin behind. This higher molecular weight fraction, corresponding to the 70.5% yield, was subjected to catalytic hydrogenation at 125° C. to 175° C. at 1000 lbs. hydrogen over nickel catalyst. This glycol was vacuum distilled at 2–5 mm. The acetyl value was 254.

In the above examples, sufficient acid has been employed to form the sulphuric esters of both hydroxyl groups.

Example 5 is considered to be the preferred method for carrying out this invention at the present state of development.

Suitable reagents for sulphating are 100% sulphuric acid, or acid of slightly less strength, chlorsulphonic acid, acetyl sulphuric acid, oleum, or oleum in the presence of acetic acid or acetic anhydride.

Suitable reagents for neutralizing are sodium and potassium hydroxides or carbonates.

This process is operable either by adding the glycol to the sulphating agent or, reversely, by adding the sulphating agent to the glycol, providing proper temperature control is maintained.

Likewise neutralization may be accomplished by either adding the sulphation mass to the alkali solution, or by adding the alkali to the sulphation mass if the temperature is kept low. Cooling during neutralization is desirable in order to minimize hydrolysis of the esters, since secondary alcohol sulphates are known to be more sensitive to hydrolysis at elevated temperatures than are the primary derivatives.

Increase in temperature beyond the range specified during sulphation will lead to dehydration and the production of sulphonates.

Other long chain symmetrical dialkyl ethylene glycols, which may be sulphated in accordance with the processes hereinabove described, include diamyl ethylene glycol (dodecanediol-6, 7), tetradecanediol-6,7, dihexyl ethylene glycol (see German Patent 277,392), dioctyl ethylene glycol, ditridecyl ethylene glycol, diheptadecyl ethylene glycol, and 10, 11 dimethyl eikosanediol-10,11. Either or both of these alkyl radicals may carry substituents such as halogen, amino, alkoxy, branch chain alkyl, etc. The carbon atoms adjoining the hydroxyl-bearing carbon atoms of the glycol may be primary, secondary, or tertiary.

The new compositions covered in this application belong to the class of surface active or capillary active materials in that they have colloidal properties and may therefore, be advantageously used in any process involving wetting, penetrating, deterging, dispersing, emulsifying, frothing, foaming, and kindred phenomena. These compositions may be employed in pure or standardized form, and if desired, in conjunction with known processing or treating agents. They may be used by themselves or in combination with other surface active agents in any relation in which surface active agents having colloidal properties have heretofore been used.

Many uses of these new compositions are connected with treatments for processing and improving natural and synthetic textile materials. A few representative uses of these new products as textile assistants will be mentioned in order that the importance and widespread applicability of these new products in the textile industries may be fully appreciated. They may be used alone or in combination with other suitable detergents for cleansing and scouring vegetable and animal fibers when removing fatty or oily materials. They may be used as penetrants in acid solutions which are used for carbonizing vegetable matter in wool. When added to flax retting baths, they function as wetting and penetrating agents. They may be employed as assistants in fulling and felting processes. They may be used in sizing preparations in combination with the usual materials such as starches or gelatine or their equivalents, clays, talcs or their equivalents, oils and oils processed by oxidation, polymerization, sulphonation, etc. The penetrating power of these new compositions is utilized with advantage when they are added to baths containing starch ferments which are employed for removing sizing from textile materials. They may be added to the lye liquors used for mercerizing cotton goods. They improve the absorption capability of fibrous materials when such materials are subjected to treatments for finishing, softening, stiffening, coloring, impregnating, water-proofing, and mildew-proofing. They may be used alone or in combination with other materials for lustering or delustering fabrics. They may be employed to oil or lubricate textile materials and as assistants in processes of weighting or loading fabrics. They may be used as assistants in silk degumming liquors and silk soaking solutions. They can also be used to assist in twist setting in yarn and in processes of stripping colors.

Another important class of uses of these new compositions is as assistants in the preparation and application of dyestuffs. They may be used in the preparation of dyestuffs in readily dispersible form and for the production of inorganic pigments or pigments of azo, basic, acid, vat, and sulphur dyes in a finely divided condition. As penetrants and wetting agents they assist in producing level dyeings in neutral, acid, or alkaline dyeing baths. They facilitate dyeing with developed dyes, the dyeing of animal fibers with vat dyes, the dyeing of cellulose acetate fibers with insoluble dyes, dyeing and printing with aniline black, and the dyeing of leather. In printing pastes they assist in the dispersion of the dye or dye component and facilitate its penetration into the natural or synthetic fiber.

In the leather industry these compositions function as useful wetting agents in soaking, deliming, bating, tanning, and dyeing baths. They are useful in softening and treating baths for hides and skins, particularly in baths used for fat-liquoring leather.

The dispersing and emulsifying powers of these new compositions give rise to many interesting uses. They may be utilized for converting liquid or solid substances normally insoluble in water, such as hydrocarbons, higher alcohols, etc., into dispersions. They are useful in preparing emulsions of wax and wax-like compositions which are used as leather dressings or floor polishes.

These compositions may also be used alone as contact insecticides and for enhancing the spreading and penetrating power of other parasiticides. They may be employed in agricultural sprays in combination with the ordinary insecticides and fungicides. They are useful for promoting the penetrating power of wood preservatives.

In the paper industry these products may be used as penetrants in the liquors used for cooking rags and pulp, and as assistants in paper softening, filling, and processes to increase absorbency.

These compositions may be employed as detergents in several different relations. They may be used in the washing of fruits and vegetables for spray residue removal. They may be used in combination with metal cleaning compounds in neutral or alkaline liquors. They may be used for paint, varnish, and lacquer cleaners. They may advantageously be employed as cleansing agents in hard water and where a fatty or oily film resists the ordinary cleansing media. They may be added to soap in acid or hard water baths, since these compositions do not form precipitates so readily in hard and acid waters as soaps and Turkey red oils.

These compositions may be used as aids in various chemical reactions. They may be used to control particle size and shape during precipitation or crystallization of compounds from reaction mixtures. They may be used to decrease the particle size of insoluble amine hydrochlorides just before these amines are to be diazotized.

These compositions also have several miscellaneous uses. They may be employed as foam stabilizing agents, especially for use in air-foam fire extinguishing compositions. They may be used as anti-spattering agents for fats such as lard substitutes and butter substitutes. They may also be used as frothing and collecting agents in ore flotation processes, and in other processes such as the recovery of fixed oil from the oil sands. The uses mentioned will suggest many similar ones.

As many apparently widely different embodiments of this invention may be made without widely departing from the spirit and scope thereof, it is to be understood that the invention is not limited to the specific embodiments thereof except as defined in the appended claims.

I claim:

1. Sulphuric acid esters of glycols having a general formula:

R'—CHOH—CHOH—R'' wherein R' represents an alkyl radical containing at least five, and not more than eighteen, carbon atoms in its chain and R'' represents an alkyl radical containing no more than eighteen carbon atoms.

2. A process of making the sulphuric acid esters defined in claim 1 which comprises reacting one or more glycols having the formula set forth in claim 1 with a sulphating agent at temperatures between 10° and 80° C.

3. Alkali metal salts of sulphuric acid esters of glycols having a general formula:

R'—CHOH—CHOH—R'' wherein R' represents an alkyl radical containing at least five, and not more than eighteen, carbon atoms in its chain and R'' represents an alkyl radical containing no more than eighteen carbon atoms.

4. A process of making the compositions defined in claim 3 which comprises reacting one or more glycols having the formula set forth in claim 3 with a sulphating agent at temperatures between 10° and 80° C. for a period of from 20 to 180 minutes; neutralizing the sulphation mass; drying the product; and extracting unsulphated material therefrom.

5. The sodium salt of the sulphuric acid ester of diundecyl ethylene glycol.

6. The process of making the sodium salt of the sulphuric acid ester of diundecyl ethylene glycol which comprises reacting said glycol with a sulphating agent at temperatures between 10° and 180° C., followed by neutralization of the sulphation mass with sodium hydroxide, and drying of the product.

7. Alkali metal salts of sulphuric esters of glycols having a general formula:

R'—CHOH—CHOH—R'' wherein R' and R'' represent the same saturated unsubstituted alkyl groups having straight chains containing from seven to nine carbon atoms.

8. A process of making the compositions defined in claim 7 which comprises reacting a glycol having the formula set forth in claim 7 with a sulphating agent at temperatures between 35° and 60° C. in the absence of a solvent, neutralizing the sulphation mass with an alkali metal hydroxide, and extracting unsulphated material therefrom with petroleum ether.

9. Alkali metal salts of sulphuric acid esters of glycols obtained from acyloins which are made from a mixture of the alkyl esters of lauric acid and a monocarboxylic fatty acid containing from six to eight carbon atoms in its molecule.

10. A process of making the compositions defined in claim 9 which comprises dissolving 25 parts of the glycols mentioned in claim 9 in a chlorinated short chain aliphatic compound, slowly adding 25 parts of chlorsulphonic acid to said solution at temperatures between 35° and 50° C., neutralizing the sulphation mass with an alkali metal hydroxide, drying the product, and extracting unsulphated material therefrom.

11. A salt of a sulphated glycol having from 8 to 38 carbon atoms and having the hydroxyl groups attached to adjacent carbon atoms.

12. Process for preparing wetting agents and detergents comprising sulphating a glycol having 8 to 38 carbon atoms having hydroxyl groups attached to adjacent carbon atoms and forming a salt by neutralizing said sulphate.

13. Sulphuric acid esters of glycols having a general formula:

R'—CHOH—CHOH—R'' wherein R' represents a saturated unsubstituted alkyl group containing from five to eighteen carbon atoms in its chain and wherein R'' represents a saturated unsubstituted alkyl group containing no more than eighteen carbon atoms.

14. Alkali metal salts of sulphuric acid esters of glycols having a general formula:

R'—CHOH—CHOH—R'' wherein R' represents a saturated unsubstituted alkyl group containing from five to eighteen carbon atoms in its chain and wherein R'' represents a saturated unsubstituted alkyl group containing no more than eighteen carbon atoms.

ROLAND GEORGE BENNER.

CERTIFICATE OF CORRECTION.

Patent No. 2,091,956. September 7, 1937.

ROLAND GEORGE BENNER.

It is hereby certified that error appears in the printed specification of the above numbered patent requiring correction as follows: Page 2, first column, line 15, Example 2, for the last portion of the formula "$-C_{22}H_{23}$," read $-C_{11}H_{23}$,; and that the said Letters Patent should be read with this correction therein that the same may conform to the record of the case in the Patent Office.

Signed and sealed this 25th day of January, A. D. 1938.

Henry Van Arsdale,
Acting Commissioner of Patents.

(Seal)